(12) United States Patent
Tobin et al.

(10) Patent No.: US 10,087,912 B2
(45) Date of Patent: Oct. 2, 2018

(54) VORTEX GENERATOR FOR A ROTOR BLADE

(71) Applicant: General Electric Company, Schenectady, NY (US)

(72) Inventors: James Robert Tobin, Simpsonville, SC (US); Stefan Herr, Greenville, SC (US); Scott Gabell Riddell, Greer, SC (US); Michael Christopher Booth, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 331 days.

(21) Appl. No.: 14/610,041

(22) Filed: Jan. 30, 2015

(65) Prior Publication Data
US 2016/0222941 A1  Aug. 4, 2016

(51) Int. Cl.
*F03D 1/06* (2006.01)
*F03D 13/10* (2016.01)

(52) U.S. Cl.
CPC ......... *F03D 1/0675* (2013.01); *F03D 1/0633* (2013.01); *F03D 13/10* (2016.05); *F05B 2240/122* (2013.01); *F05B 2240/30* (2013.01); *F05B 2240/311* (2013.01); *Y02E 10/721* (2013.01); *Y02P 70/523* (2015.11)

(58) Field of Classification Search
CPC ............... F03D 1/0633; F03D 1/0675; F05B 2240/122; F05B 2240/311; F05B 2240/32
See application file for complete search history.

(56) References Cited

U.S. PATENT DOCUMENTS

| 5,058,837 A * | 10/1991 | Wheeler ................. B64C 23/06 244/198 |
| 7,585,157 B2 | 9/2009 | Quell et al. |
| 7,878,457 B2 | 2/2011 | Narramore |
| 8,047,801 B2 | 11/2011 | Fang et al. |
| 2008/0175711 A1 | 7/2008 | Godsk |
| 2009/0068018 A1 | 3/2009 | Corten |
| 2010/0159204 A1 * | 6/2010 | Van Merksteijn ...... B64C 21/10 428/169 |
| 2012/0100005 A1 * | 4/2012 | Ostergaard Kristensen ................ F03D 1/0608 416/241 R |

(Continued)

FOREIGN PATENT DOCUMENTS

DE  102013210737 A1  12/2014
EP  0947693  10/1999
(Continued)

OTHER PUBLICATIONS

Samsung Wind Turbine 2.5MW Brochure, www.shi.Samsung.co.kr.
European Search Report issued in connection with corresponding EP Application No. 16152096.0 dated Jun. 17, 2016.

*Primary Examiner* — Matthew W Jellett
(74) *Attorney, Agent, or Firm* — Dority & Manning, P.A.

(57) ABSTRACT

Universal vortex generators for wind turbine rotor blades and methods of manufacturing same are disclosed. The vortex generator includes a base portion configured for attachment to at least one of a suction side surface or a pressure side surface of the rotor blade and at least one airflow modifying element extending from the base portion. In addition, the airflow modifying element includes one or more discontinuities configured therein so as to increase flexibility of the vortex generator.

17 Claims, 6 Drawing Sheets

(56) References Cited

U.S. PATENT DOCUMENTS

2012/0257977 A1* 10/2012 Jensen ................ F03D 1/0608
　　　　　　　　　　　　　　　　　　　　　　　　416/223 R

FOREIGN PATENT DOCUMENTS

| EP | 1674723 | 6/2006 |
| EP | 1944505 | 7/2008 |
| EP | 2098721 | 9/2009 |
| EP | 2466122 A2 | 6/2012 |
| EP | 2484897 A1 | 8/2012 |
| EP | 2806156 A1 | 11/2014 |
| WO | WO 00/15961 | 3/2000 |
| WO | WO 2001/016482 | 3/2001 |
| WO | WO 2007/140771 | 12/2007 |
| WO | WO 2008/113349 | 9/2008 |
| WO | WO 2008/113350 | 9/2008 |

* cited by examiner

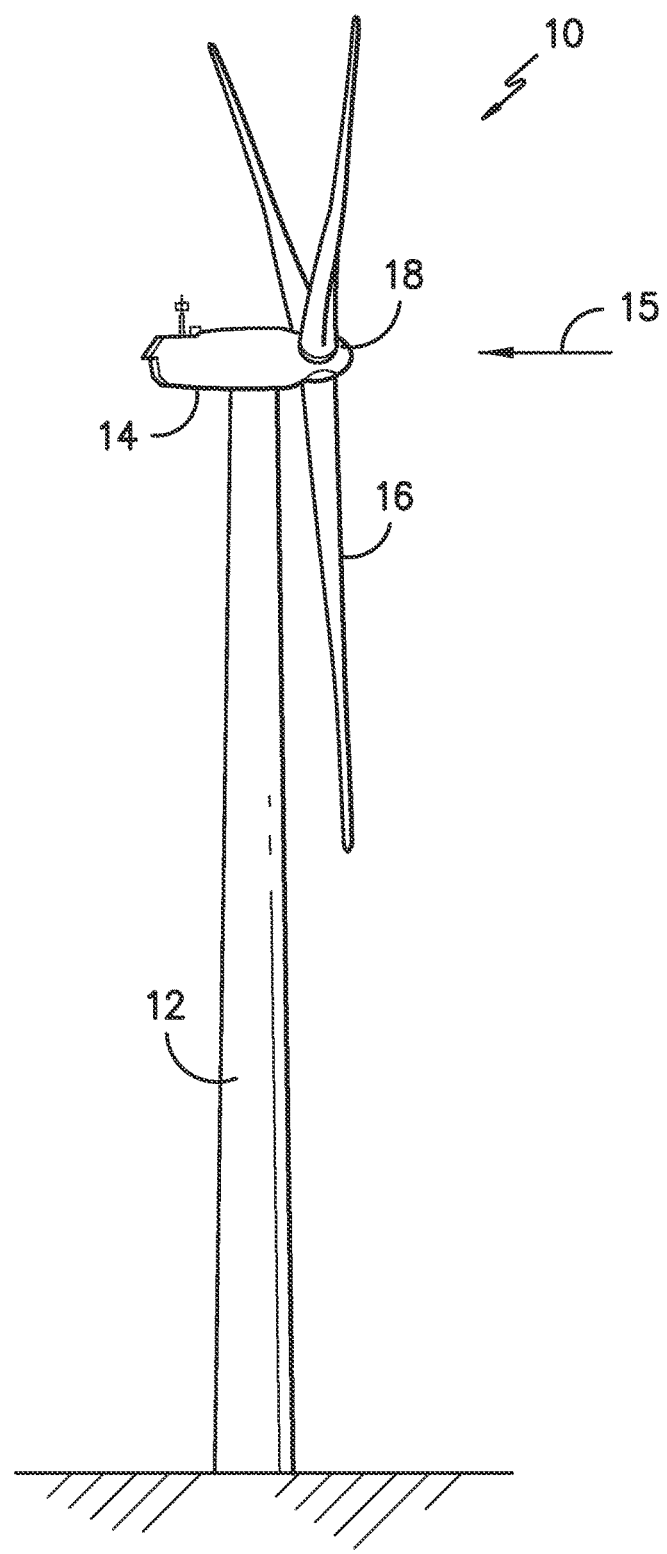
FIG. -1-

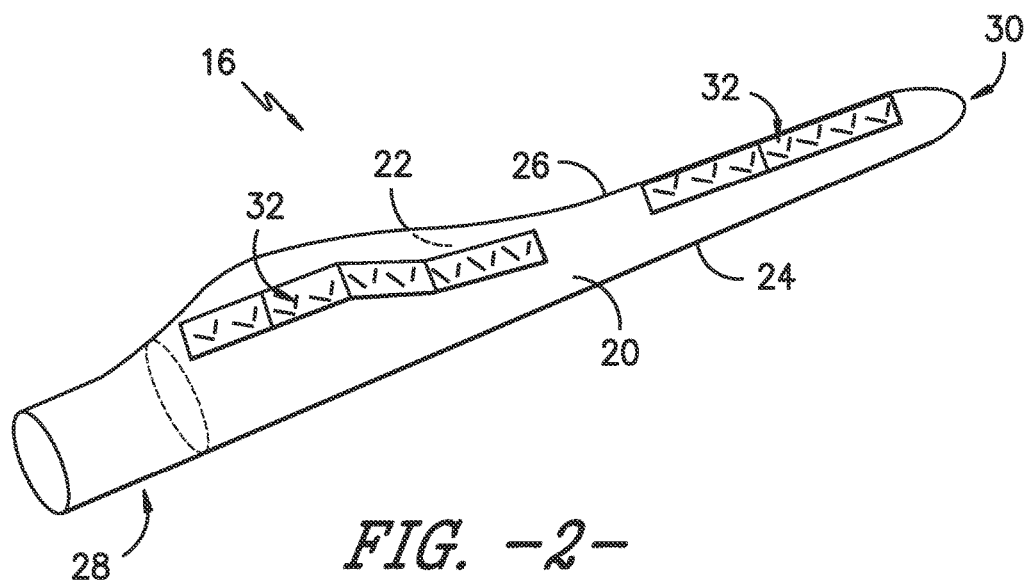
FIG. -2-
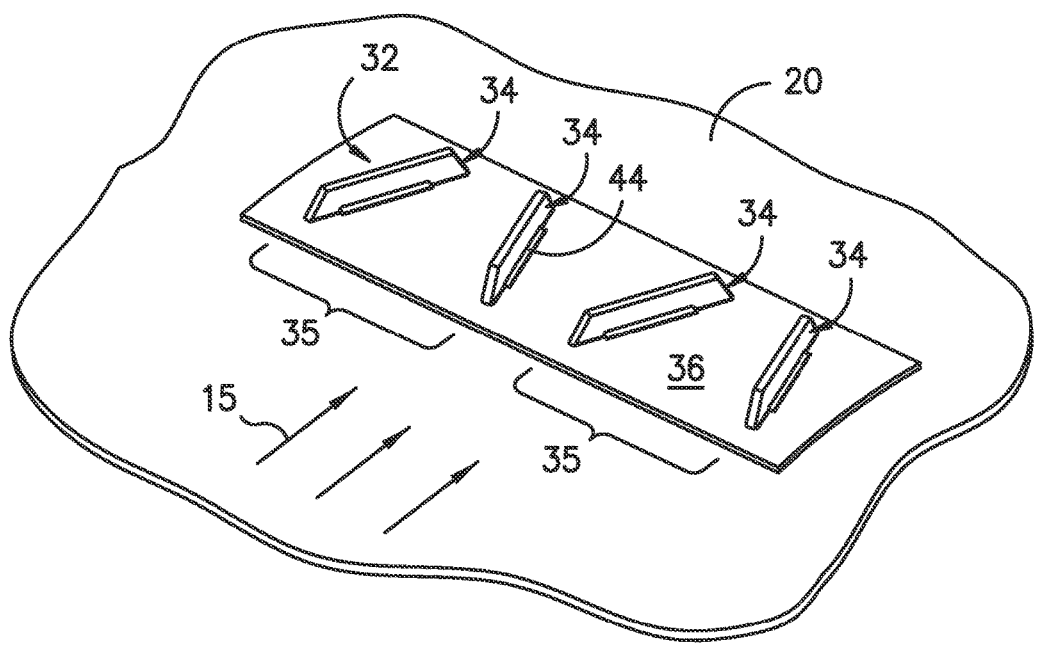
FIG. -3-

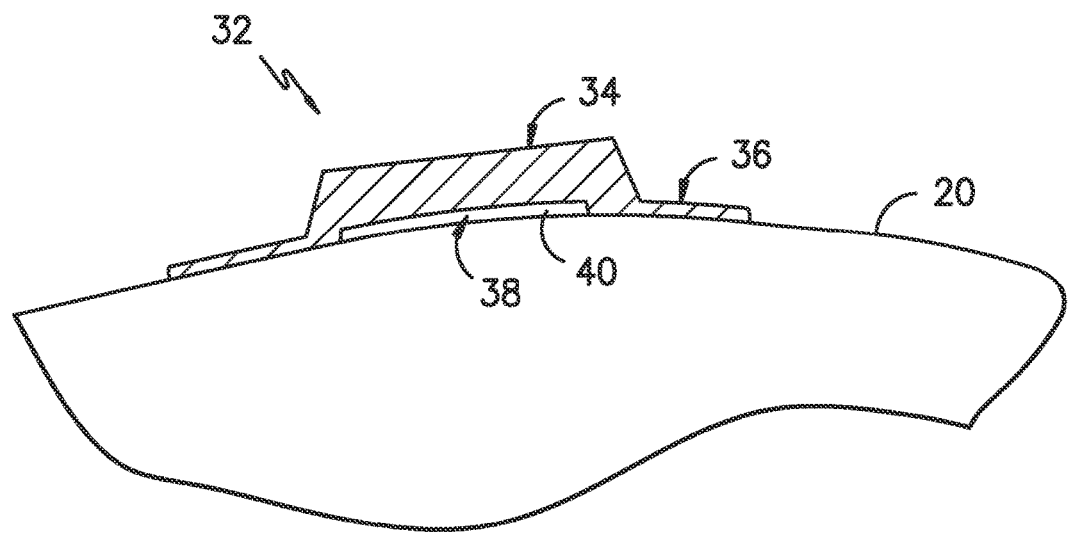
FIG. -4-
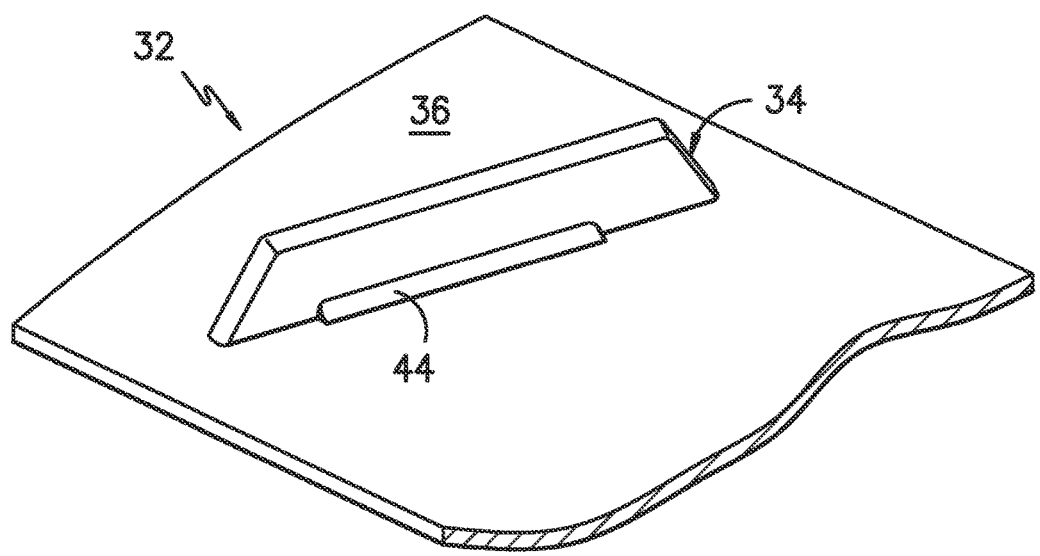
FIG. -5-

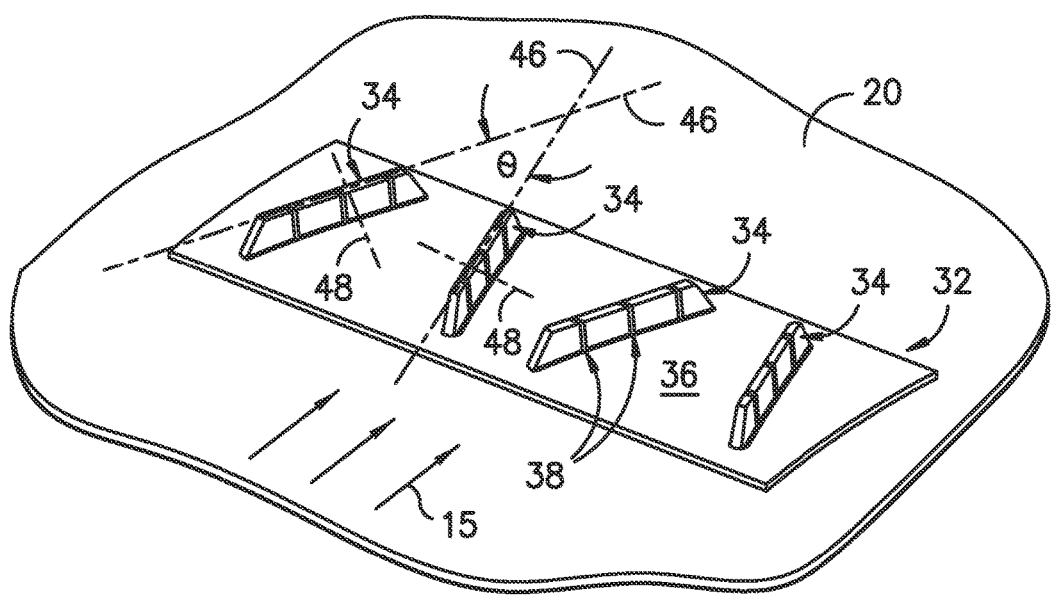
FIG. -6-
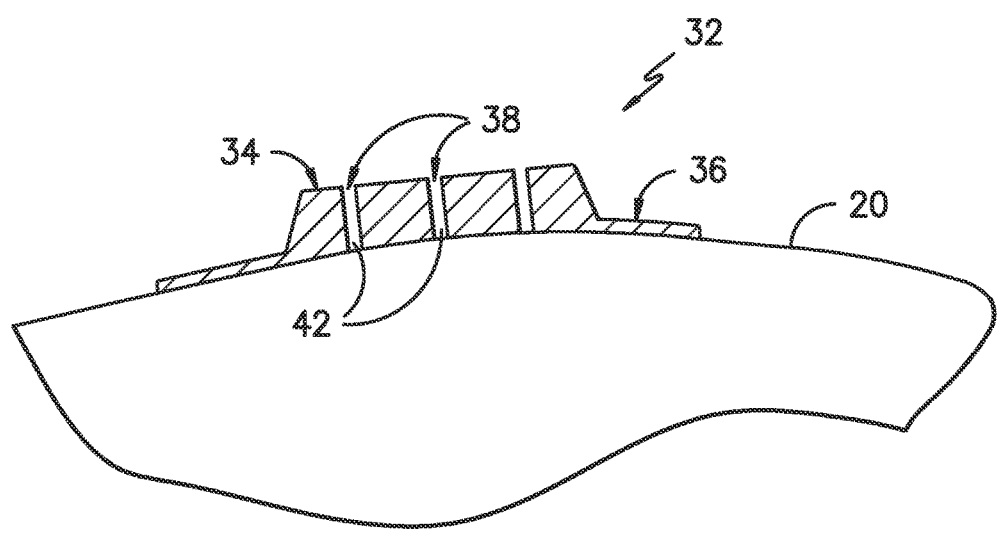
FIG. -7-

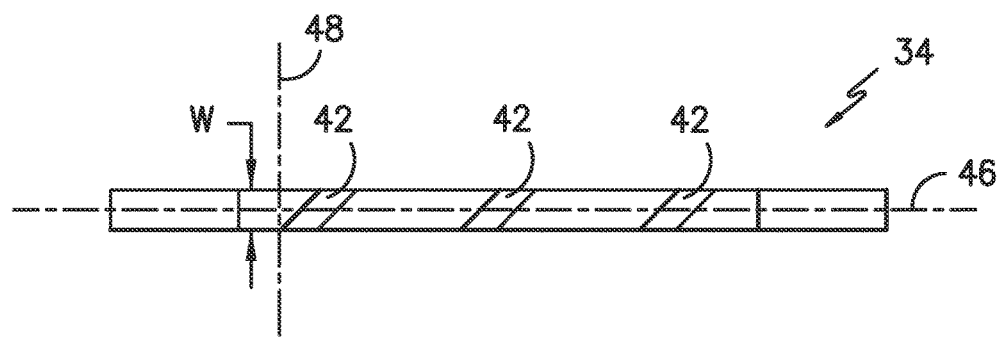
FIG. -8-
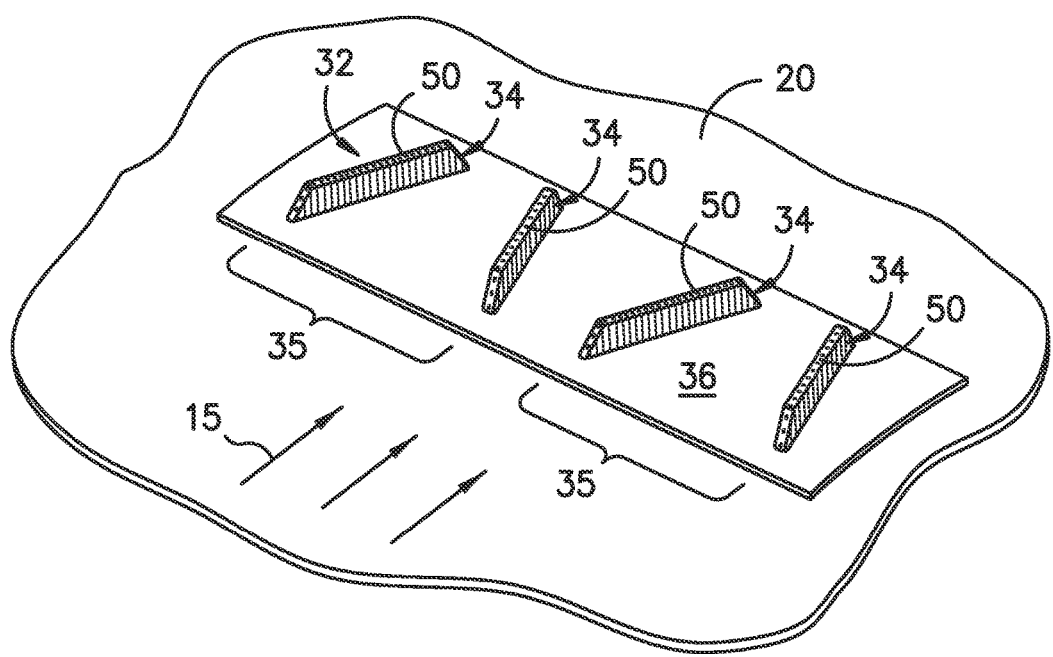
FIG. -9-

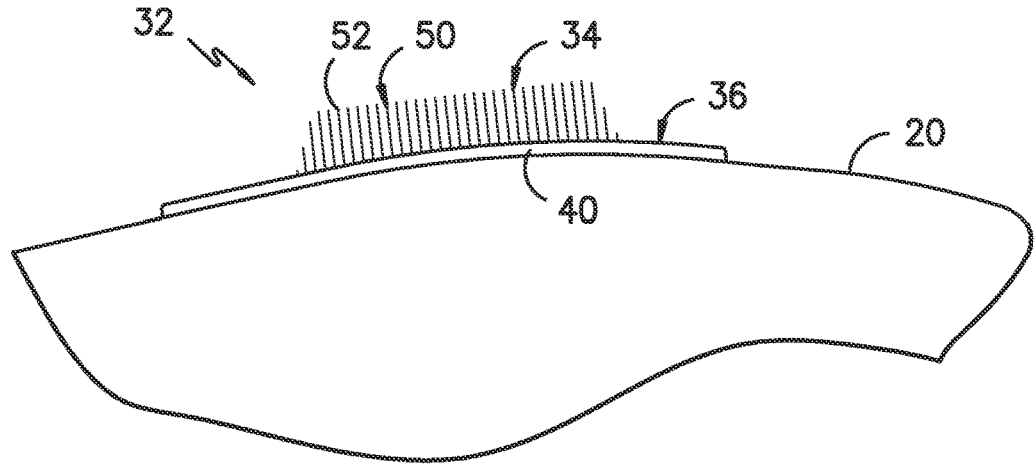

FIG. -10-

```
┌─ 102
│ PROVIDE A MOLD OF THE VORTEX GENERATOR,
│ THE MOLD OF THE VORTEX GENERATOR HAVING,
│ AT LEAST, A BASE PORTION AND A PLURALITY
│ OF AIRFLOW-MODIFYING-ELEMENT SHAPED
│ PROTRUSIONS EXTENDING THEREFROM
└─
        ↓
┌─ 104
│ FORM A SHEET MATERIAL TO THE MOLD SO AS TO
│ FORM THE VORTEX GENERATOR, WHEREIN THE
│ AIRFLOW-MODIFYING-ELEMENT SHAPED PROTRUSIONS
│ OF THE MOLD FORM A PLURALITY OF AIRFLOW
│ MODIFYING ELEMENTS IN THE VORTEX GENERATOR
└─
        ↓
┌─ 106
│ FORM ONE OR MORE DISCONTINUITIES WITHIN AT LEAST
│ ONE OF THE AIRFLOW MODIFYING ELEMENTS SO AS TO
│ INCREASE FLEXIBILITY OF THE VORTEX GENERATOR
└─
```

FIG. -11-

VORTEX GENERATOR FOR A ROTOR BLADE

FIELD OF THE INVENTION

The present invention relates generally to the field of wind turbines, and more particularly to universal vortex generators for wind turbine rotor blades.

BACKGROUND OF THE INVENTION

Turbine blades are the primary elements of wind turbines for converting wind energy into electrical energy. The working principle of the blades resembles that of an airplane wing. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The lift force is generated when the flow from the leading edge to the trailing edge creates a pressure difference between the top and bottom surfaces of the blade. Ideally, the flow is attached to both the top and bottom surfaces from the leading edge to the trailing edge. However, when the angle of attack of the flow exceeds a certain critical angle, the flow does not reach the trailing edge, but leaves the surface at a flow separation line. Beyond this line, the flow direction is generally reversed, i.e. it flows from the trailing edge backward to the separation line. A blade section extracts much less energy from the flow when it separates.

Flow separation depends on a number of factors, such as incoming air flow characteristics (e.g. Reynolds number, wind speed, in-flow atmospheric turbulence) and characteristics of the blade (e.g. airfoil sections, blade chord and thickness, twist distribution, pitch angle, etc). The detached-flow region also leads to a decrease in lift and an increase in drag force, mainly due to a pressure difference between the upstream attached-flow region and the downstream detached-flow region. Flow separation tends to be more prevalent nearer the blade root due to the relatively great angle of attack of the blade flow surfaces in this region as compared to the blade tip.

Hence, in order to increase the energy conversion efficiency during normal operation of the wind turbine, it is desired to increase the lift force of the blades while decreasing the drag force. To this purpose, it is advantageous to increase the attached-flow region and to reduce the detached-flow region by moving flow separation nearer the trailing edge of the blade. This is particularly desirable nearer to the blade root in order to increase the overall lift generated by the blade.

It is known in the art to change the aerodynamic characteristics of wind turbine blades by adding dimples, protrusions, and/or other structures on the surface of the blade. These structures are often referred to as "vortex generators" and serve to create one or more vortexes that enhance the momentum of the flow to overcome an adverse pressure gradient and prevent separation. As such, the vortex generators are configured to prolong the attached flow region and thus optimize aerodynamic airflow around the blade contour.

Conventional vortex generators are typically constructed of plastic and contain one or more "ribs" or shaped structures connected to a base that is attached to one of the flow surfaces of the turbine blade. In the past, such vortex generators had to be custom designed to fit in an exact area on the blade for which it is intended to be used, as the ribs are typically stiff and cannot easily conform to blade curvature. Thus, the manufacturing cost associated with customizing vortex generators is expensive due to higher part count and tooling costs since unique molds must be built for each part.

Accordingly, the industry would benefit from improved vortex generators that address the aforementioned issues. More specifically, universal vortex generators that could be used with nearly any blade surface would be advantageous.

BRIEF DESCRIPTION OF THE INVENTION

Aspects and advantages of the invention will be set forth in part in the following description, or may be obvious from the description, or may be learned through practice of the invention.

In accordance with aspects of the invention, a rotor blade for a wind turbine is provided having a suction side surface and a pressure side surface. The rotor blade includes at least one vortex generator configured on at least one of the suction side or pressure side surfaces. The vortex generator includes a base portion with at least one airflow modifying element extending therefrom. Further, the airflow modifying element includes one or more discontinuities configured therein so as to increase flexibility of the vortex generator.

In one embodiment, the one or more discontinuities include an opening in a lower portion of the airflow modifying element such that a gap is created between the airflow modifying element and the rotor blade when attached. In another embodiment, the vortex generator may include an airflow limiting component blocking at least a portion of the gap so as to limit air flow through the gap. For example, in certain embodiments, the airflow limiting component may include an adhesive, sealant, tape, foam, cork, one or more flaps, a plurality of tines, or similar.

In an alternative embodiment, the one or more discontinuities may include a plurality of apertures or channels spaced apart along a lengthwise axis of the airflow modifying element. In additional embodiments, the apertures may extend through a width of the airflow modifying elements. Further, in certain embodiments, the apertures may be angled with respect to the lengthwise and widthwise axes of the airflow modifying element.

In still another embodiment, the rotor blade may include a plurality of airflow modifying elements. Thus, in particular embodiments, the plurality of airflow modifying elements may include a plurality of ribs or a plurality of tine bundles. More specifically, the ribs and/or tine bundles may form any suitable shape. For example, in one embodiment, each of the ribs may have a substantially trapezoidal shape. In addition, in certain embodiments, the plurality of airflow modifying elements may be arranged in pairs, with each pair of airflow modifying elements arranged at opposite angles with respect to each other, e.g. +45 degrees and −45 degrees.

In another aspect, the present disclosure is directed to a method of manufacturing a vortex generator for a rotor blade of a wind turbine. More specifically, the method includes providing a mold of the vortex generator. The mold of the vortex generator includes, at least, a base portion and a plurality of airflow-modifying-element shaped protrusions extending therefrom. Another step includes forming a pliable sheet material to the mold so as to form the vortex generator, wherein the airflow-modifying-element shaped protrusions of the mold form a plurality of airflow modifying elements in the vortex generator. The method also includes forming one or more discontinuities within at least one of the airflow modifying elements so as to increase flexibility of the vortex generator.

The method of manufacturing the vortex generator as described herein may include any suitable methods known in the art, including but not limited to vacuum forming, compression forming, thermoforming, or similar. In addition, the discontinuities may be formed within the airflow modifying element(s) using a variety of methods and may depend upon the chosen manufacturing method. For example, in one embodiment, the method includes forming one or more discontinuities into the airflow-modifying-element shaped protrusions of the mold such that the discontinuities are formed into the part as it is being made. Alternatively, the method may include machining one or more discontinuities into the airflow modifying elements after forming the sheet material to the mold.

In yet another aspect, the present disclosure is directed to a vortex generator for a rotor blade of a wind turbine. The vortex generator includes a base portion configured for attachment to at least one of a suction side surface or a pressure side surface of the rotor blade and at least one airflow modifying element extending from the base portion. In addition, the airflow modifying element includes one or more discontinuities configured therein so as to increase flexibility of the vortex generator during operation. It should be understood that the vortex generator may be further configured with any of the additional features as described herein.

The invention also encompasses a wind turbine having one or more turbine blades configured with the unique vortex generators as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art is set forth in the specification, which makes reference to the appended figures, in which:

FIG. 1 illustrates a perspective view of a conventional wind turbine;

FIG. 2 illustrates a perspective view of an embodiment of a wind turbine blade in accordance with aspects of the invention;

FIG. 3 illustrates a perspective view of one embodiment of a vortex generator according to the present disclosure;

FIG. 4 illustrates a detailed, cross-sectional view of the vortex generator of FIG. 3;

FIG. 5 illustrates an enlarged, partial perspective view of the vortex generator of FIG. 3;

FIG. 6 illustrates a perspective view of another embodiment of a vortex generator according to the present disclosure;

FIG. 7 illustrates a cross-sectional view of the vortex generator of FIG. 6;

FIG. 8 illustrates a top view of one of the airflow modifying elements of the vortex generator of FIG. 6;

FIG. 9 illustrates a perspective view of another embodiment of a vortex generator according to the present disclosure;

FIG. 10 illustrates a detailed, cross-sectional view of the vortex generator of FIG. 9;

FIG. 11 illustrates a flow diagram of a method for manufacturing a vortex generator according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

The present invention is described herein as it may relate to a component of a wind turbine blade. It should be appreciated, however, that the unique vortex generator configuration in accordance with principles of the invention is not limited to use on wind turbine blades, but is applicable to any type of airfoil or flow surface that would benefit from the modified aerodynamic characteristics provided by the vortex generator. Examples of such surfaces include airplane wings, boat hulls, sails, and so forth.

Generally, the present disclosure is directed to a universal vortex generator for a rotor blade of a wind turbine and methods of manufacturing same. The vortex generator includes a base portion configured for attachment to either or both of the suction side or pressure side surfaces of the rotor blade and at least one airflow modifying element extending from the base portion. The airflow modifying element includes one or more discontinuities configured therein so as to increase flexibility of the vortex generator. The increased flexibility of the airflow modifying element provides a universal vortex generator that can be fit to rotor blades having varying sizes and/or shapes.

The present disclosure provides many advantages not present in the prior art. For example, the manufacturing process for the universal vortex generators requires fewer parts to inventory, fewer parts to monitor during installation, and simpler installation. In addition, the manufacturing process has reduced tooling, start-up, and/or part costs. Moreover, the universal vortex generators of the present disclosure can be installed at multiple locations of varying rotor blade surfaces, in contrast to previous designs, which were designed for a specific location on a single rotor blade surface. In addition, in some instances, the flexibility of the vortex generator allows movement that can be beneficial to performance.

Referring now to the drawings, FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 depicts a wind turbine blade 16 incorporating aspects of the invention. As shown, the blade 16 includes a suction side surface 20, a pressure side surface 22, a leading edge 24, and a trailing edge 26. Further, the blade 16 extends from a root portion 28 to a tip portion 30. A plurality of unique vortex generators 32 in accordance with aspects of the invention described in greater detail below are placed at any location on either or both of the flow surfaces 20, 22 of the blade 16 wherein it is desired to modify the aerodynamic characteristics of the surface. For example, in the embodiment illustrated in the figures, the vortex generators 32 are depicted on the suction side surface 20 for illustrative purposes only. It should be appreciated that the vortex generators 32 could also be provided on the pressure side surface 22.

More specifically, in a particular embodiment, the vortex generators 32 are defined on the suction side surface 20 at a span length of between about 15% to about 65% and about 75% to about 90%, as depicted in FIG. 2. As used herein, a span of the rotor blade 16 generally refers to the direction extending between the root portion 28 to the tip portion 30, whereas the chord of the rotor blades 16 generally refers to the direction extending between the leading edge 24 to the trailing edge 26. Further, the vortex generators 32 may be disposed closer to the root portion 28 of the blade 16 as compared to the tip portion 30, or closer to the tip portion 30 as compared to the root portion 28. It should be understood that the invention is not limited to any particular placement of the vortex generators 32 on either or both flow surfaces 20, 22 of the blade 16.

Referring now to FIGS. 3 and 4, a detailed, perspective view and a corresponding cross-sectional view of one embodiment of the vortex generator 32 according to the present disclosure is illustrated. As shown, the vortex generator 32 includes a base portion 36 with at least one airflow modifying element 34 extending therefrom. More specifically, in the illustrated embodiment, four airflow modifying elements 34 are extending from the base portion 36. In further embodiments, more than four or less than four airflow modifying elements 34 may extend from the base portion 36.

In addition, as shown generally in FIGS. 4-7, the airflow modifying elements 34 of the present disclosure include one or more discontinuities 38 configured to increase flexibility of the vortex generator 32. Thus, when the vortex generator 32 is installed, the vortex generator 32 either substantially fits to the blade surface 20 with no significant deformation or deforms to match the surface 20 with less curvature. For example, in certain embodiments, the discontinuities 38 may include openings, apertures, recesses, slits, slots, holes, channels, protrusions, ribs, or similar. Therefore, it should be understood that the discontinuities 38 may extend fully or partially through the airflow modifying element 34 in any direction.

More specifically, as shown in FIG. 4, the airflow modifying element 34 may include one or more openings or recesses 40 or open slots in a lower portion of the airflow modifying element 34 such that one or more gaps are created between the airflow modifying element 34 and the surface 20 of the blade 16 when attached thereto. Thus, the resulting gap(s) allows the airflow modifying element 34 to more easily flex with varying blade surfaces as needed. Further, as shown, the opening 40 may be a single slot that runs lengthwise along the airflow modifying element 34. Alternatively, the airflow modifying element 40 may include a plurality of openings 40 spaced apart along the lengthwise axis of the vortex element 34. More specifically, in a particular embodiment, the openings 40 may start on either end of the airflow modifying element 40 such that only the central portion of the airflow modifying element 40 is attached to the base portion 36 and two gaps are formed between the element 34 and the surface 20 of the rotor blade 16.

In additional embodiments, as shown in FIG. 5, the vortex generator 32 may also include an airflow limiting component 44 configured to block at least a portion of the opening 40 so as to limit air flow through the gap formed between the airflow modifying element 34 and the blade surface 20. As such, the airflow limiting component 44 is configured to offset any change in aerodynamic performance caused by the opening 40. In certain embodiments, the airflow limiting component 44 may include adhesive, sealant, tape, foam, cork, one or more flaps, or similar. For example, as shown, the airflow limiting component 44 includes a flap located on each side of the opening 40.

In an alternative embodiment, as shown in FIGS. 6 and 7, the one or more discontinuities 38 may include a plurality of apertures 42 spaced apart along a lengthwise axis 46 of the airflow modifying element 32 so as to form a plurality of ribs. Thus, as the vortex generator 32 deforms, the deformation causes the shorter ribs to bend towards (or away from) each other. The overall vortex for the vortex generator 32 will develop through the merging of the smaller vortices from the individual shorter length ribs. Further, as shown, the apertures 42 may extend through a width W of the airflow modifying element 34. In additional embodiments, the apertures 42 may only extend through a portion of the width. In further embodiments, the apertures 42 may be angled with respect to the lengthwise and widthwise axes 46, 48, e.g. as shown in FIG. 8.

As mentioned, the plurality of airflow modifying elements 34 may be arranged in any suitable configuration on one of the blade surfaces 22, 24 so as to provide the desired air flow. For example, as shown in FIGS. 3 and 6, the airflow modifying elements 34 are arranged in pairs having opposite angles with respect to each other. More specifically, corresponding pairs of airflow modifying elements 34 may be angled away from each other, e.g. at a 90-degree angle, an acute angle, or an obtuse angle. For example, as shown in FIGS. 3 and 6, the corresponding pairs 35 of airflow modifying elements 34 form angle θ with respect to the wind direction 15.

In further embodiments, the airflow modifying elements 34 may be formed using a variety of methods. For example, as generally illustrated in the figures, the airflow modifying elements 34 may form substantially solid ribs, as shown in FIGS. 3-5. In an alternative embodiment, as shown in FIGS. 9-10, each of the airflow modifying elements 34 may be constructed of a plurality of tines 52 or tine bundles 50. As used herein, a "tine bundle" broadly encompasses a plurality of tines, bristles, prongs, or similar, arranged together to form a single airflow modifying element 34. Similarly, a "plurality of tine bundles" refers to more than one tine bundle 50. For example, as shown in FIGS. 9-10, there are four tine bundles 50, with each bundle 50 having a plurality of tines 52. As such, an airflow modifying element 34 formed from a plurality of tines 52 may be the same or similar shape as a vortex generator 34 constructed of a solid material. The tine bundles 50, however, by their very nature, are inherently more flexible than a vortex generator constructed of a solid material and therefore can be used with blades having varying shapes and/or curvature. More specifically, in flatter surface applications, as the vortex generator 32 is bonded to the blade 16, the flexing of the base portion 36 would further compress the tines together and maintain a feature that would continue to create a vortex. In another embodiment, a tine bundle can be mounted inside one of the airflow modifying elements 34, e.g. within the opening 40, to block any flow from going through the gap.

Thus, the airflow modifying elements 34, whether ribs, tine bundles, or similar, may have any suitable body and/or cross-sectional shape configurations within the scope and spirit of the invention. More specifically, in certain embodiments, the body of the airflow modifying elements 34 may have a fin-type, wedge-type, or a crescent/sand-dune shape. For example, in certain embodiments, the airflow modifying elements 34 may be considered as being modeled after naturally occurring sand dunes, which act as vortex generators in nature. The unique sand-dune shape generates the aerodynamic vortexes without significantly increasing drag, which is highly desirable for a vortex generator on a wind turbine flow surface. Further, as shown generally in the figures, the rib-shaped vortex elements 34 have a substantially trapezoidal cross-sectional shape. In further embodiments, the airflow modifying elements 34 may have a rectangular, square, arcuate, triangular, crescent, or any other suitable cross-sectional shape.

It should be understood that the vortex generators described herein may be constructed of any suitable material. For example, in one embodiment, the vortex generators may be formed of a relatively rigid material so as to develop the desired aerodynamic properties, e.g. plastic or metal material. Alternatively, the vortex generators may be constructed of a flexible, low durometer material.

Referring now to FIG. 11, a flow diagram of a method 100 for manufacturing a vortex generator according to the present disclosure is illustrated. More specifically, as shown at 102, the method 100 includes providing a mold of the vortex generator, wherein the mold of the vortex generator has, at least, a base portion and a plurality of airflow-modifying-element shaped protrusions extending therefrom. At 104, the method 100 includes forming a pliable sheet material, e.g. plastic, to the mold so as to form the vortex generator, wherein the airflow-modifying-element shaped protrusions of the mold form a plurality of airflow modifying elements in the vortex generator. At 106, the method includes forming one or more discontinuities within at least one of the airflow modifying elements so as to increase flexibility of the vortex generator. By providing airflow modifying elements with at least one discontinuity, the vortex generator is more flexible and therefore can be used on a variety of blade surfaces having different curvature.

The method 100 of manufacturing the vortex generator as described herein may include any suitable methods known in the art, including but not limited to vacuum forming, compression forming, thermoforming, or similar. In addition, the discontinuities may be formed within the airflow modifying element(s) using a variety of methods and may depend upon the chosen manufacturing process. For example, in one embodiment, if the vortex generators are manufactured using compression forming, the discontinuities may be formed into the airflow-modifying-element shaped protrusions of the mold such that the discontinuities are formed into the part as it is being made. Alternatively, the discontinuities may be machined into the airflow modifying elements after the vortex generator is formed.

In still additional embodiments, the vortex generators 32 may be formed by first molding a base portion and subsequently installing one or more bosses in the desired airflow modifying locations. After installation of the bosses, one or more airflow modifying elements can be installed into those bosses at the locations. In another embodiment, a flexible base portion can be formed with slots to locate stiff vertical ribs. Thus, the ribs can be placed in the slots and then the base portion can be bonded to the blade. It should also be understood that the present invention encompasses any configuration of wind turbine 10 (FIG. 1) that includes one or more blades 16 incorporating at least one of the unique airflow modifying elements 32 as described herein.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. As mentioned, it should also be appreciated that the invention is applicable to any type of flow surface, and is not limited to a wind turbine blade. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A rotor blade of a wind turbine, the rotor blade comprising:
    a suction side surface and a pressure side surface; and
    at least one vortex generator configured on at least one of said suction side or said pressure side surfaces, the at least one vortex generator comprising a base portion being generally parallel to at least one of said suction side or said pressure side surfaces and a rib extending substantially perpendicularly from the base portion and at least one of said suction side or said pressure side surfaces, the rib comprising a top surface and a bottom surface separated by a thickness,
    wherein the bottom surface of the rib comprises one or more discontinuities formed in the rib so as to increase flexibility of the vortex generator, the one or more discontinuities extending partially through the thickness of the rib and terminating before the top surface.

2. The rotor blade of claim 1, wherein the one or more discontinuities comprises an opening such that a gap is created between the rib and the rotor blade.

3. The rotor blade of claim 2, further comprising an airflow limiting component configured to block at least a portion of the gap so as to limit air flow through the gap.

4. The rotor blade of claim 3, wherein the airflow limiting component comprises at least one of adhesive, sealant, tape, foam, cork, one or more flaps, or a plurality of tines.

5. The rotor blade of claim 1, wherein the at least one vortex generator further comprises a plurality of ribs.

6. The rotor blade of claim 5, wherein the plurality of ribs are arranged in pairs, and wherein each pair of ribs are arranged at opposite angles with respect to each other.

7. The rotor blade of claim 5, wherein each of the ribs comprises a substantially trapezoidal cross-sectional shape.

8. A method of manufacturing a vortex generator for a rotor blade of a wind turbine, the method comprising:
    providing a mold of the vortex generator, the mold of the vortex generator having, at least, a base portion and a plurality of rib-shaped protrusions extending substantially perpendicularly therefrom, the base portion being generally parallel to at least one of a suction side surface or a pressure side surface when mounted to the rotor blade;
    forming a sheet material to the mold so as to form the vortex generator, wherein the rib-shaped protrusions of the mold form a plurality of ribs in the vortex generator, each of the ribs comprising a top surface and a bottom surface separated by a thickness; and forming a plurality of discontinuities into the bottom surface of at least one of the ribs and adjacent to the base portion so as to increase flexibility of the vortex generator, the one or more discontinuities extending partially through the thickness of the rib and terminating before the top surface of the rib.

9. The method of claim 8, wherein forming the plurality of discontinuities within at least one of the ribs further comprises at least one of: forming the plurality of discontinuities into the rib-shaped protrusions of the mold or machining the plurality of discontinuities into the ribs after forming the sheet material to the mold.

10. A vortex generator for a rotor blade of a wind turbine, the vortex generator comprising:

a base portion configured for attachment to at least one of a suction side surface or a pressure side surface of the rotor blade, the base portion being generally parallel to at least one of a suction side surface or a pressure side surface of the rotor blade when mounted thereto; and a rib extending substantially perpendicularly from the base portion and at least one of said suction side or said pressure side surfaces when mounted to the rotor blade, the rib comprising a top surface and a bottom surface separated by a thickness, wherein the bottom surface of the rib comprises one or more discontinuities so as to increase flexibility of the vortex generator, the one or more discontinuities adjacent to the base portion, the one or more discontinuities extending partially through the thickness of the rib and terminating before the top surface.

11. The vortex generator of claim 10, wherein the one or more discontinuities comprises an opening in a lower portion of the rib such that a gap is created between the rib and the base portion.

12. The vortex generator of claim 11, further comprising an airflow limiting component blocking at least a portion of the gap so as to limit air flow through the gap, wherein the airflow limiting component comprises at least one of adhesive, sealant, tape, foam, cork, one or more flaps, or a plurality of tines.

13. The vortex generator of claim 10, wherein the one or more discontinuities comprises a plurality of apertures spaced apart along a lengthwise axis of the rib.

14. The vortex generator of claim 10, further comprising a plurality of ribs.

15. The vortex generator of claim 10, wherein the plurality of ribs are arranged in pairs, and wherein each pair of ribs are arranged at opposite angles with respect to each other.

16. The vortex generator of claim 10, wherein the rib comprises a substantially trapezoidal shape.

17. The vortex generator of claim 13, wherein each of the plurality of apertures extend through a width of the rib.

* * * * *